United States Patent
Dacosta

(10) Patent No.: US 7,231,559 B2
(45) Date of Patent: Jun. 12, 2007

(54) OUTAGE PREDICTOR FOR COMMUNICATION LINK

(75) Inventor: Behram Mario Dacosta, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 491 days.

(21) Appl. No.: 10/738,803

(22) Filed: Dec. 17, 2003

(65) Prior Publication Data

US 2005/0149835 A1 Jul. 7, 2005

(51) Int. Cl.
*H04L 1/20* (2006.01)
(52) U.S. Cl. .................................... 714/708; 714/817
(58) Field of Classification Search ............... 714/704, 714/708, 817
See application file for complete search history.

(56) References Cited

U.S. PATENT DOCUMENTS

| | | | | |
|---|---|---|---|---|
| 4,901,319 A | * | 2/1990 | Ross ........................ 714/788 |
| 5,541,955 A | * | 7/1996 | Jacobsmeyer ............ 375/222 |
| 5,546,411 A | * | 8/1996 | Leitch et al. ............. 714/708 |
| 5,563,918 A | * | 10/1996 | Waldschmidt et al. ...... 375/347 |
| 5,924,015 A | * | 7/1999 | Garrison et al. .......... 455/13.4 |
| 6,064,890 A | * | 5/2000 | Hirose et al. ............. 455/513 |
| 6,075,797 A | * | 6/2000 | Thomas .................... 370/468 |
| 6,130,907 A | * | 10/2000 | Chen ........................ 370/342 |
| 6,154,489 A | * | 11/2000 | Kleider et al. ............ 375/221 |
| 6,167,031 A | * | 12/2000 | Olofsson et al. .......... 370/252 |
| 6,389,066 B1 | * | 5/2002 | Ejzak ....................... 375/224 |
| 6,408,189 B1 | * | 6/2002 | Nakamura et al. ........ 455/504 |
| 6,452,950 B1 | * | 9/2002 | Ohlsson et al. ........... 370/516 |
| 6,888,900 B2 | * | 5/2005 | Starr et al. ................ 375/340 |
| 6,904,059 B1 | * | 6/2005 | Newson et al. ........... 370/516 |
| 6,959,048 B1 | * | 10/2005 | Horneman et al. ........ 375/299 |
| 6,965,780 B1 | * | 11/2005 | Monogioudis et al. .... 455/522 |
| 6,999,432 B2 | * | 2/2006 | Zhang et al. .............. 370/328 |
| 2002/0075830 A1 | * | 6/2002 | Hartman, Jr. ............. 370/333 |
| 2002/0110138 A1 | * | 8/2002 | Schramm .................. 370/430 |

* cited by examiner

*Primary Examiner*—Stephen M. Baker
(74) *Attorney, Agent, or Firm*—Blakely, Sokoloff, Taylor & Zafman LLP.

(57) ABSTRACT

A device for estimating a likelihood of a wireless link outage includes a memory, a variability calculator, and an outage predictor. The memory maintains a history of signal quality for a signal received from a transmitter. The variability calculator is coupled to the memory. The variability calculator computes a variability statistic for the history of signal quality maintained in the memory. The outage predictor is coupled to the variability calculator. The outage predictor estimates the likelihood of the wireless link outage in direct proportion to the variability statistic.

27 Claims, 1 Drawing Sheet

OUTAGE PREDICTOR FOR COMMUNICATION LINK

BACKGROUND OF THE INVENTION

Wireless data links can be unreliable. Sudden outages can disrupt voice and data communication. Even momentary outages in data transmission may cause problems for multimedia streaming applications by causing noticeable artifacts observable by the viewer of the multimedia stream. If such outages could be predicted, it would be easier for the receiver to make mitigating changes to reduce or eliminate the adverse effects of reception outages in a wireless link.

SUMMARY OF THE INVENTION

A device for estimating a likelihood of a wireless link outage includes a memory, a variability calculator, and an outage predictor. The memory maintains a history of signal quality for a signal received from a transmitter. The variability calculator is coupled to the memory. The variability calculator computes a variability statistic for the history of signal quality maintained in the memory. The outage predictor is coupled to the variability calculator. The outage predictor estimates the likelihood of the wireless link outage in direct proportion to the variability statistic.

DETAILED DESCRIPTION OF THE INVENTION

Figure 1:
FIG. 1 is a block diagram of a simple wireless network that uses an embodiment of the invention.

As shown in FIG. 1, a wireless network may have a node that includes a device for estimating a likelihood of a wireless link outage. The device may include a memory, a variability calculator, and an outage predictor. The wireless link may connect nodes in a wireless network in a variety of environments such as a residential home environment. The device may be a receiver, or a receiver-transmitter combination.

The wireless network shown in FIG. 1 shows a first wireless node 10, which is at least a receiver, and a second wireless node 12 which is at least a transmitter. The wireless network shown in FIG. 1 is a minimal network in which the invention can be used and shown without obscuring the details of the invention. It will be appreciated that the invention can be used in wireless networks of greatly varying topologies having more nodes than shown in FIG. 1, with each of the nodes possibly taking on more than one role with respect to the invention. The invention may be used with a variety of wireless networks, such as but not limited to 802.11 radio frequency (RF) wireless networks or infrared (IR) wireless networks.

Figure 2:
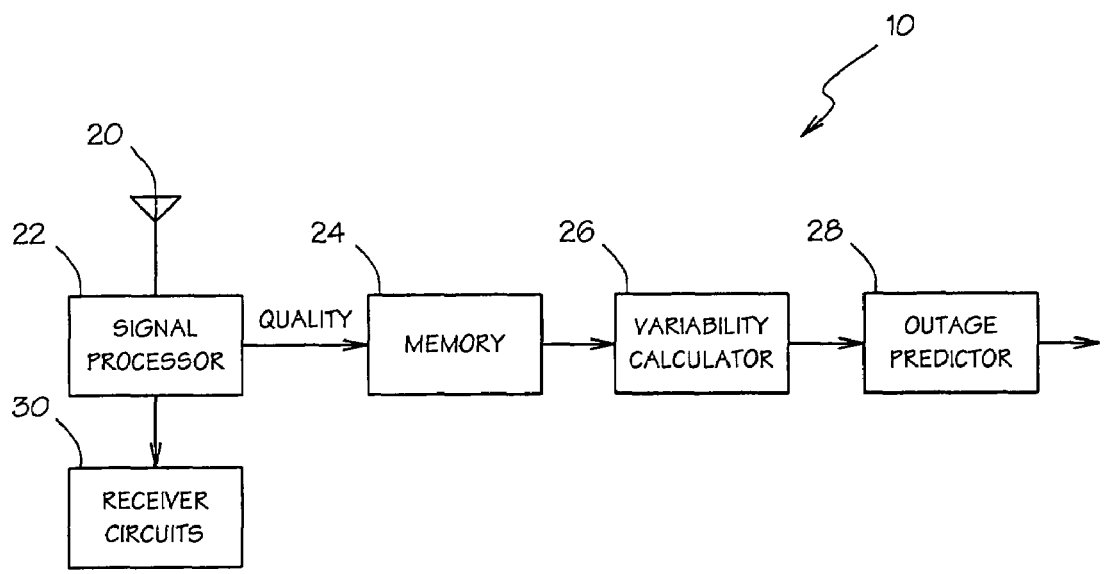
FIG. 2 is a block diagram of a portion of a wireless node that includes an embodiment of the invention.

FIG. 2 shows a block diagram of a portion of the first wireless node 10. A signal transmitted by the second wireless node 12 may be received at the first wireless node 10 by an antenna 20. The signal may be processed by a signal processor 22. As part of the signal processing, the signal processor 22 may produce a signal quality value based on the quality of the signal being received at that moment. The output of the signal processor 22 may be provided to additional receiver circuits 30 in the first wireless node 10.

While a single receive antenna 20 is shown, it will be appreciated that the first wireless node 10 could include multiple receive antennas. The signal processor 22 may produce a signal combined or derived from one or more antennas. The signal quality may be based on the combined or derived signal. Multiple antennas may be used with various reception techniques such as antenna switched selection diversity, Maximum Ratio Combining (MRC), beam forming, or Multiple Input Multiple Output (MIMO). The signal processor 22 may produce a signal quality value based on the quality of the signal being received from an individual receive antenna, or a combination of signals from multiple receive antennas. The signal quality may be based on signals at one or more different stages of processing.

The signal quality may be based on any of a variety of observable received signal parameters. These are many different measures of signal quality, depending on where in the "processing chain" signal quality is measured, and what algorithms are used. Any parameter or combination of parameters that provides a measure that is proportional to the "goodness" or "strength" of the usable signal may be used as the signal quality value.

For example, the signal quality may be a received signal strength (RSS) for the received signal. The received signal strength (RSS) may be raw power in a channel used to receive the signal. In another embodiment, signal quality may be packet error rate (PER). In another embodiment, signal quality may be a signal to interference and noise ratio (SINR) for the received signal. The signal to interference and noise ratio (SINR) may be based on the signal that is coherent and any interference in a channel used to receive the signal. In another embodiment, the signal quality may be an unencoded bit error rate (BER) for the signal received from the transmitter. Unencoded bit error rate is the bit error rate prior to forward error correction (FEC). In another embodiment, the signal quality may be an encoded BER, which is the BER after FEC.

A memory 24 may maintain a history of the signal quality values. The memory 24 may record signal quality values received from the signal processor 22 at predetermined intervals. For example, the memory 24 may store the signal quality value every millisecond. The memory 24 may record signal quality values for a predefined length of time. For example, the memory 24 may store the signal quality values for the preceding fifty milliseconds thus storing fifty signal quality values if a signal quality value is stored every millisecond.

A variability calculator 26 is coupled to the memory 24. The variability calculator 26 computes a variability statistic for the history of signal quality maintained in the memory 24. The variability calculator 26 may recompute the variability statistic each time a signal quality value is stored in the memory or after a predetermined number of signal quality values are stored in the memory. The variability statistic may be any computed value that gives a measure of variability for the signal quality of the received signal. Examples of variability statistics include variance, standard deviation, range, or quartile deviation.

An outage predictor 28 is coupled to the variability calculator 26. The outage predictor 28 estimates the likelihood of a wireless link outage in direct proportion to the variability statistic computed by the variability calculator 26. As the variability of the signal quality increases, it is predicted that the likelihood of a wireless link outage becomes greater without regard to the signal quality itself.

Predicting outages based on the variability of the signal quality may provide an early indication of an imminent outage.

The wireless node 10 may include hardware devices that provide the functional blocks shown in FIG. 2. In some embodiments some or all the functional blocks may be provided by a processor that performs a method for estimating a likelihood of a wireless link outage corresponding to the functional blocks. In a processor that provides all of the functional blocks of FIG. 2, the processor performs various operations that may include maintaining a history of signal quality for a received signal, computing a variability statistic for the history of signal quality maintained in a memory, and estimating the likelihood of the wireless link outage to be directly proportional to the variability statistic.

The processor may be a programmable device that receives a computer-readable medium having a sequence of instructions. The sequences of instructions, when executed by the processor, cause the processor to perform the method for estimating a likelihood of a wireless link outage. The sequence of instructions may include a sequence for maintaining a history of signal quality for a received signal, a sequence for computing a variability statistic for the history of signal quality maintained in a memory, and a sequence for estimating the likelihood of the wireless link outage to be directly proportional to the variability statistic. The sequence of instructions may be in a computer readable medium such as a read-only memory, a magnetic or optical disk, or other medium capable of providing a sequence of instructions to a programmable device.

The wireless node 10 may make a mitigating change to the wireless link if the variability statistic is above a predetermined threshold and an outage is predicted. The mitigating change may be switching to a more reliable modulation rate or increasing the size of a receive buffer. The mitigating change may be selected in response to the magnitude of the variability statistic. The wireless node 10 may make more than one mitigating change to the wireless link, either unconditionally or when the magnitude of the variability statistic is large.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A receiving device for mitigating a predicted wireless link outage, the receiving device comprising:
   a memory to maintain a history of signal quality for a received signal;
   a variability calculator coupled to the memory, the variability calculator to compute a variability statistic for the history of signal quality maintained in the memory; and,
   an outage predictor coupled to the variability calculator, the outage predictor to increase the size of a receive buffer if the variability statistic is above a predetermined threshold.

2. The receiving device of claim 1, wherein signal quality is based on a combined signal.

3. The receiving device of claim 1, wherein signal quality is an unencoded bit error rate for the received signal.

4. The receiving device of claim 1, wherein the variability statistic is standard deviation.

5. The receiving device of claim 1, wherein the history is for a predefined length of time.

6. The receiving device of claim 1, wherein signal quality is a received signal strength (RSS) for the received signal.

7. The receiving device of claim 6, wherein the received signal strength (RSS) is raw power in a channel used to receive the signal.

8. The receiving device of claim 1, wherein signal quality is a signal to interference and noise ratio (SINR) for the received signal.

9. The receiving device of claim 8, wherein the signal to interference and noise ratio (SINR) is based on the signal that is coherent and any interference in a channel used to receive the signal.

10. A method for mitigating a predicted wireless link outage at a receiving device, the method comprising:
    maintaining a history of signal quality for a received signal;
    computing a variability statistic for the history of signal quality maintained in a memory; and,
    increasing the size of a receive buffer if the variability statistic is above a predetermined threshold.

11. The method of claim 10, wherein signal quality is based on a combined signal.

12. The method of claim 10, wherein signal quality is an unencoded bit error rate for the received signal.

13. The method of claim 10, wherein the variability statistic is standard deviation.

14. The method of claim 10, wherein the history is for a predefined length of time.

15. The method of claim 10, wherein signal quality is a received signal strength (RSS) for the received signal.

16. The method of claim 15, wherein the received signal strength (RSS) is raw power in a channel used to receive the signal.

17. The method of claim 10, wherein signal quality is a signal to interference and noise ratio (SINR) for the received signal.

18. The method of claim 17, wherein the signal to interference and noise ratio (SINR) is based on the signal that is coherent and any interference in a channel used to receive the signal.

19. A computer-readable medium having a sequence of instructions, the sequences of instructions, when executed by a processor, causing the processor to perform a method for mitigating a predicted wireless link outage at a receiving device, the sequence of instructions comprising:
    a sequence for maintaining a history of signal quality for a received signal;
    a sequence for computing a variability statistic for the history of signal quality maintained in a memory; and,
    a sequence for increasing the size of a receive buffer if the variability statistic is above a predetermined threshold.

20. The computer-readable medium of claim 19, wherein signal quality is based on a combined signal.

21. The computer-readable medium of claim 19, wherein signal quality is an unencoded bit error rate for the received signal.

22. The computer-readable medium of claim 19, wherein the variability statistic is standard deviation.

23. The computer-readable medium of claim 19, wherein the history is for a predefined length of time.

24. The computer-readable medium of claim 19, wherein signal quality is a received signal strength (RSS) for the received signal.

25. The computer-readable medium of claim 24, wherein the received signal strength (RSS) is raw power in a channel used to receive the signal.

26. The computer-readable medium of claim 19, wherein signal quality is a signal to interference and noise ratio (SINR) for the received signal.

27. The computer-readable medium of claim 26, wherein the signal to interference and noise ratio (SINR) is based on the signal that is coherent and any interference in a channel used to receive the signal.

* * * * *